March 26, 1946.  L. R. GIMENEZ  2,397,346
ROTARY MILL
Filed Feb. 27, 1943  3 Sheets-Sheet 1
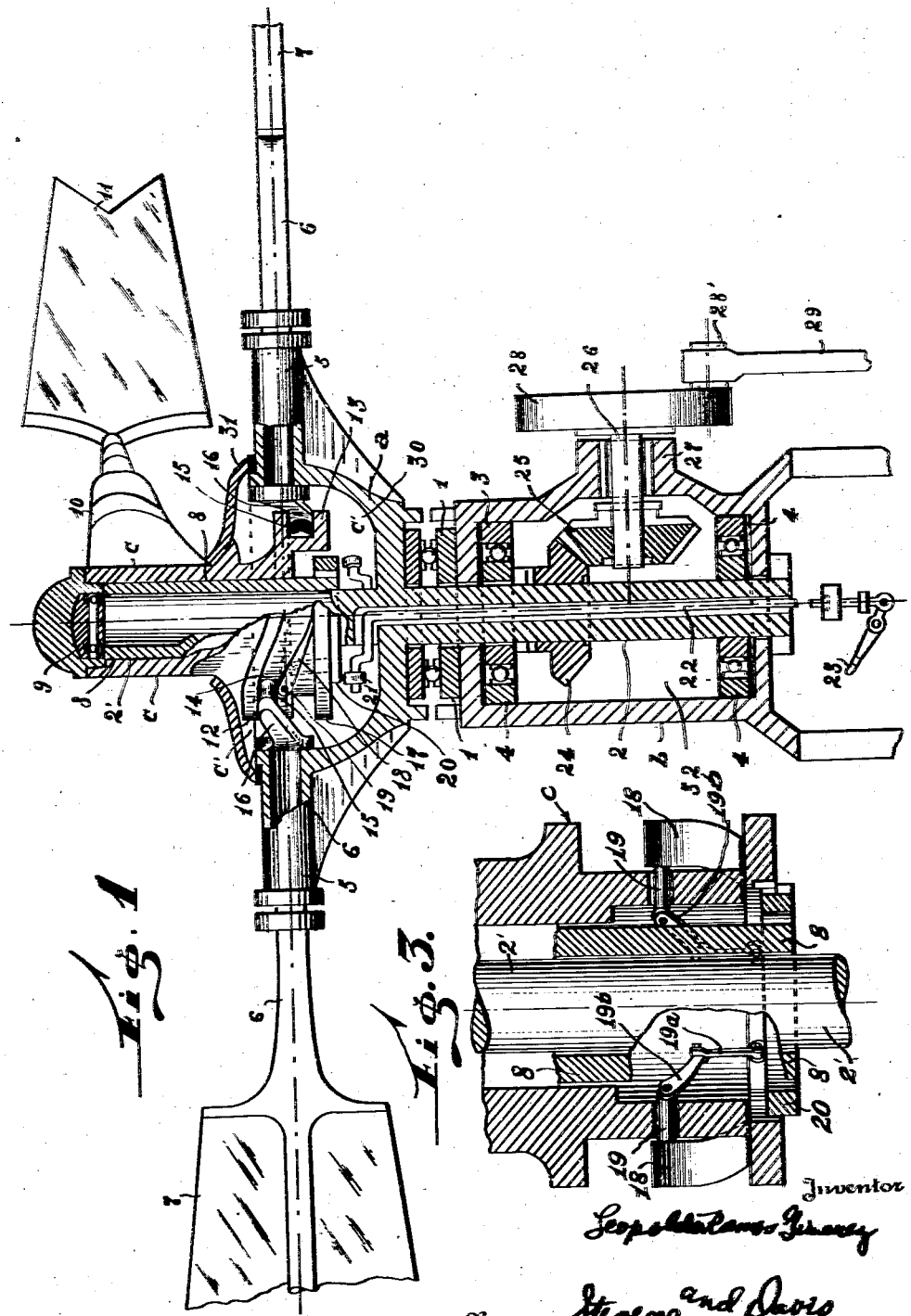

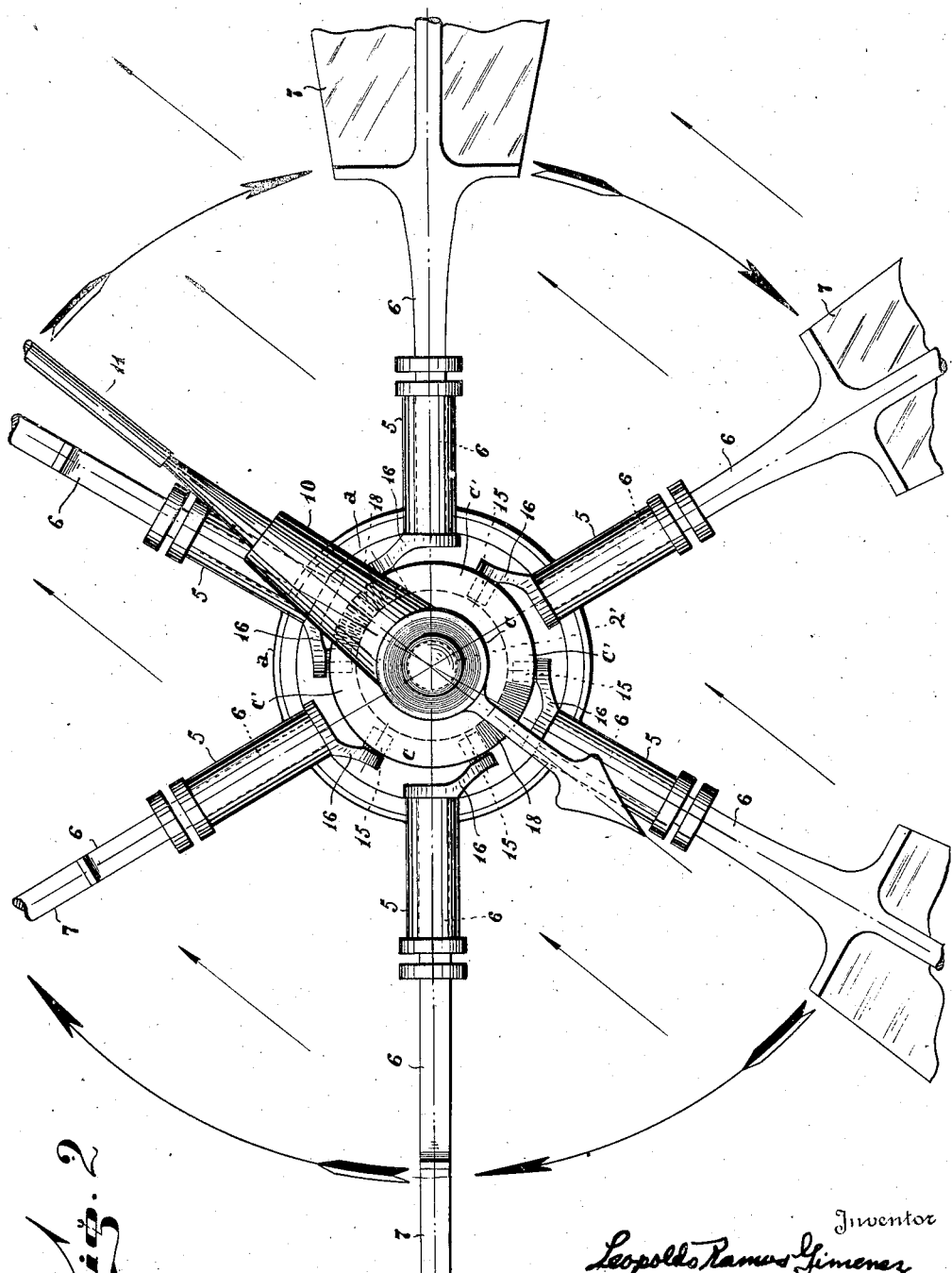

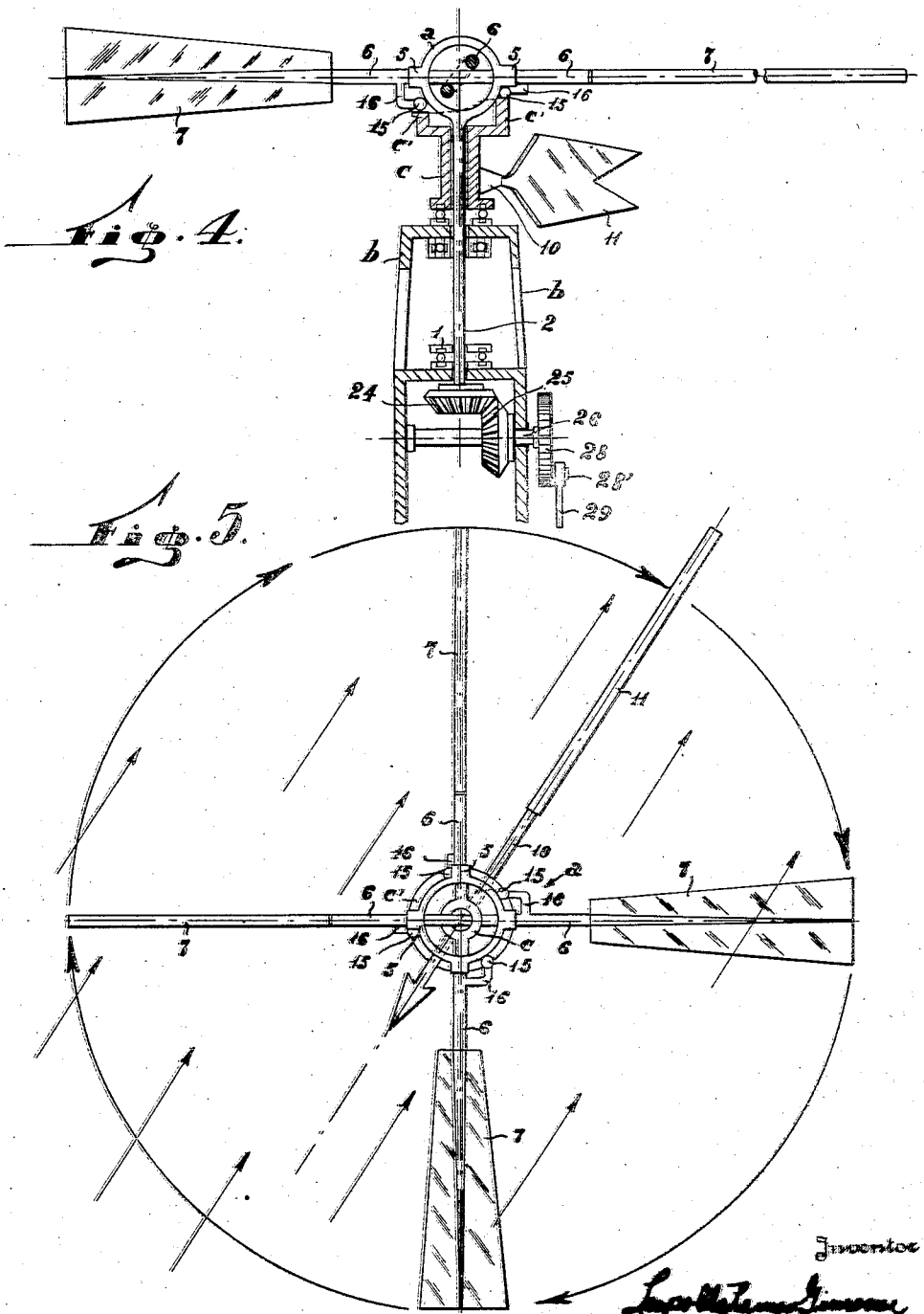

Patented Mar. 26, 1946

2,397,346

UNITED STATES PATENT OFFICE 2,397,346

ROTARY MILL

Leopoldo Ramos Gimenez, Buenos Aires, Argentina

Application February 27, 1943, Serial No. 477,425
In Argentina January 21, 1943

3 Claims. (Cl. 170—29)

The present invention relates to a rotary mill and has for its object to provide an effective basis for the utilization of the driving force of natural air or water currents so that, for all practical purposes, the problems offered by the rotors of similar machines due to the irregularities and variation of said currents, may be considered as resolved.

Actually the rotor vanes of the existing mills are built with a determined pitch which enables them to be driven by the air or water current, but due to which they can only use 25% of the driving force existing on the surface of the vanes, and the driving power which can be derived from their moving element is so small that only by the use of reducing gear the necessary power for operating pumps or similar devices can be obtained.

Due to the necessity of using the reduction gear, the resulting movement is so slow that positive effects are obtainable with great rotor velocities only, which means that, in case of windmills, the velocity of the wind must be considerable, at least seven meters per second.

On the other hand, a light breeze, although it is able to cause a movement of the rotor, produces a movement which is so slow that, when reduced to one fourth of its original amount, can only produce an operating displacement of no value.

Again, due to the frontal position of the rotor with respect to the wind and given the characteristics and position of the wheel on the supporting tower, an excessive wind velocity can also interrupt the normal operation of the device and may seriously damage and even destroy the machine, unless the latter is provided with a device which automatically adjusts the vanes to a neutral position.

To all this there ought to be added that, in order to find effective breezes, the mills must operate at certain heights above the ground, which constitutes a further disadvantage, since the price of the tower required for the mounting, undoubtedly raises the cost of the complete installation.

In order to avoid these drawbacks, experiments have been carried out with some devices in which the vanes, instead of being disposed in a permanently inclined position, are mechanically combined to shift from a vertical to a horizontal position, in which they do not offer resistance to the driving wind or current. However, due to the fact that these devices have used the doorleaf disposition of the vanes, the resulting vibrations and clashes interfered with the normal operation of the apparatus, to such an extreme that the grade of efficiency which could be obtained, did not correspond to the quality of the machine.

There is no doubt that a realization based on this principle would constitute the ideal solution for the maximum utilization of the driving force of currents, but under the only condition that the devices and the means used would allow a direct, simple and frictionless setting of the vanes, which precisely has been attained in the rotor subject of the present invention, which due to its peculiar characteristics and according to results obtained in several tests, immediately will find its application in actual practice and which will tend to replace the wheels with inclined vanes of the older systems.

More specifically, the invention relates to a device of the type in which a rotor, provided with radially arranged vanes located in a horizontal plane or planes, revolves on a vertical axis and comprises operating means which can modify the position of the vanes by impelling a simple movement of partial rotation to the arms of said vanes, this movement being caused by governing means the position of which vary so that the vanes are always shifted to a vertical position only in the section which corresponds to the direction of the wind or current, the driving force of which is used.

To this end, the vanes which are mounted on a rotatable casing, are provided with rotatably mounted arms which are connected to a control device placed on the shaft of the rotor, the position of said control device depending on the position of the rudder or steering vane.

As a result of this combination, the power derived from the rotor movement is so great, that the rotor is able to drive pumps or other similar devices which are commonly used with mills, directly and without any reducing gear, the slightest breeze being sufficient and capable of attaining an effective operation of the driven element; the transformation of the driving force of the current into the rotational movement of the rotor may be considered as the highest obtainable and four times the value obtained in mills of the older systems.

Among the several objects of the present invention is the possibility to obtain mills or rotors of a simple, economic and rugged construction.

A further object of the invention is to render possible an operation with currents or winds of high or low velocities, due to the direct relationship between the rotor shaft and the driven element.

A still further object of the invention is to achieve a compensated unit with a central mounting on using an essentially radial disposition around the revolving shaft of the rotor whereby a rugged and compensated device is obtained which cannot be damaged by storms.

A further object of this invention is to avoid great mounting heights of the windmills, thus making possible to eliminate the tower, which can be replaced by simple and economical columns.

A still further object of the invention is the possibility to obtain mills with submerged rotors which can operate in rivers at great depths with great efficiency using the driving power of the current near the bottom of said rivers.

Other objects of the present invention will become apparent from the course of the following specification, when read in conjunction with the accompanying drawings, which show the new mill by way of example and in a preferred embodiment.

In the drawings:

Fig. 1 is a sectional view of the assembled rotary mill, and gives an idea of how the rotor is formed by the mounted vanes, demonstrating moreover the vane arms governed by the control device which is rotated by a rudder or steering vane operated by the wind.

Fig. 2 is a top view of the same unit, showing in a graphic form the operation of the vanes which, responding to the control device, shift to a vertical position in the sector which corresponds to the direction of the wind, while turning to a horizontal position in the opposite sector.

Fig. 3 is a partial longitudinal cross section taken along a line passing through the axes of the tongues of Fig. 2 and looking in the direction of the depending end of said tongues.

Fig. 4 is another embodiment of the mill based on the same principle but with the difference that the vane arms, instead of being independent one of each other, are diametrically mounted in a crosswise position; and finally Fig. 5 is a top view of the unit shown in Fig. 4, which in this particular case has only four vanes.

The same reference characters indicate like or corresponding parts or elements in all figures.

As may be seen from the drawings, $a$ is the casing of the rotatable armature which is mounted on the collar step bearing 1 and which adapts itself by means of shaft 2 to the bearings 3 and 4. Said collar step bearing 1 and bearings 3 and 4 are mounted on the casing $b$ which may correspond to a tower or column, according to the dispostion and use of the mill.

Casing $a$ comprises several radial bushings 5 which include arms 6 of vanes 7, so that said arms 6 and in general the vanes, are radially arranged with respect to the centre of rotation, e. g. shaft 2.

The vane unit constitutes a rotor, the general plane of which is essentially horizontal and which revolves around a vertical shaft 2.

Extension 2' of shaft 2 adapts itself to the control device $c$ which, being mounted on a sleeve 8 around said extension 2' is supported by the bearing 9 located on the upper terminal of said extension.

The device $c$ is provided with an arm 10 which ends with a rudder 11 and which operates as a steering vane adjusting itself to the direction of the wind.

Due to the fact that the control device $c$ is freely mounted on extension 2' of shaft 2, said device is oriented according to the direction of the wind, thus determining the correct disposition of the guiding slot $c'$ which governs the position of vanes 7.

Said slot $c'$ comprises an arcuate section 12 located on an upper or maximum plane and an arcuate section 13 located on a lower or minimum plane, but nevertheless said slot constitutes a continuous guide, since both sections 12 and 13 are interconnected by slanting paths 14.

Said slots $c'$ receives rollers 15 of cranks 16 which are fixed to the internal ends of vane arms 6.

Due to this disposition, the rotor when revolving as a unit, e. g. when the vanes revolve with the casing $a$, does not influence the control device $c$, since said control device is freely mounted on extension 2' and is in turn governed by the steering vane 11 according to the direction of the wind.

The ascending and descending slanting paths 14 are diametrically located on a line which coincides with the radius of the rudder, and due to the action of said rudder 11, said slanting paths 14 are located on a line which corresponds to the direction of the wind.

Cranks 16 are so constructed that its rollers when operating in the upper plane, section 12, adjust the corresponding vanes to a vertical position with respect to the direction of the wind, said vanes thus directly receiving the full driving force of the wind; on the other hand, when said rollers shift to the opposite or lower plane section 13, cranks 16 adapt the corresponding vanes to the opposite or horizontal position, thus eliminating the resistance of the vanes in the section corresponding to the inoperative part of the cycle, a maximum degree of efficiency in the utilization of the driving force, thus being obtained since the vanes, in the operating sector, receive the full pressure of the wind.

Slot $c'$ includes a closed track with two sections 12 and 13 located on different planes, and is in addition provided with an annular side track 17, which is located on the same plane as section 13, and tongues 18 partially defining the slanting paths 14. Upon reference to Fig. 3 it will be seen that each tongue 18 is rigidly fixed to one end of a shaft 19 that is mounted for rotation in a bore in the casing of device $c$. The end of each shaft 19 remote from the end attached to the tongue 18 is rigidly fixed to an arcuate arm 19b. A link 19a is pivotally attached at one end to each arm 19b and is pivotally connected at its other end to annular member 20. The arm 19b and arm 19a lying in the annular space defined between the sleeve 8 and the body of the device $c$. Annular member 20 is adapted to be vertically shifted by the operation of roller 21. Said rollers 21 are arranged on an angle of a spindle 22, which is included and guided in an axial boring in shaft 2, and as may be seen in Fig. 1, said spindle 22 ends with an operating handle 23 which causes a longitudinal displacement of said spindle, when shifted to the dotted position.

When displaced, rollers 21 of spindle 22 cause a shifting of part 20, which in turn changes the position of switch tongue 18, which occupying the dotted position, forces all rollers 18 to operate at the same plane, that is to say in the section 13 and in the side track 17, holding the vanes permanently in a horizontal position with respect to the direction of the wind and rendering the mill inactive in case of unusually strong winds.

Rotating shaft 2 which at the same time constitutes the main element of the machine, from which driving power is derived, is provided with a fixed pinion 24 engaging pinion 25 with equal number of teeth, which is mounted by means of its axle 26 in bearing 27; and as can be seen, said axle comprises an eccentric 28 provided with a bolt 28' adapted to the coupling rod 29 which is directed towards the lower part and is coupled to the piston of the pump or another element which is driven by the mill.

Under certain circumstances, instead of using the above described combination of gears, shaft 2 may be extended to the lower part in order to operate directly, derivations or suitable combinations according to the requirements.

In the model shown in Figures 4 and 5, arms 6 are not only radial, but are constituted by rods placed diametrically and which are also provided with cranks 16 and rollers 15 which are governed by slot c' under the same conditions of the models shown in Figures 1, 2 and 3; the control device of the model shown in Figures 4 and 5 being also freely mounted on a descending portion of shaft 2.

*Mode of operation*

The rudder or steering vane 11 of the mill assembled as shown in the various drawings, will stay in the direction of the wind, so that the control device c will occupy the corresponding position for the governing of vanes 7.

The wind, the direction of which is indicated by the arrows in Figures 2 and 4, impells only the vanes which are in the vertical or operative position, without influencing the opposite vanes which on the contrary are in the horizontal or inoperative position.

The operative position of vanes 7 in the corresponding sector is caused by rollers 15 of cranks 16 which are guided in the upper section 12 of the guiding slot c', while the inoperative position of the vanes is, on the other hand, due to rollers 15 which when entering a definite sector, are guided in lower section 13 of said guiding slot c'.

Since the guiding slot c' extends over 360° of the circumference and constitutes a continuous track, the passage between sections 12 and 13 is formed by slanting paths 14, the inclination of which is sufficiently moderate to avoid abrupt movements and vibration of vanes 7.

The change in the position of the vanes is thus effected without disturbing the rotation of the rotor which is caused by the impulse of the wind; and consequently, the mechanical control of the position of the vanes practically does not affect the normal operation of the unit. Thus an unusual high degree of efficiency in the use of the driving power of natural currents is obtained. As a result of such efficiency, the driving power derived from shaft 2 of a common size apparatus, will operate pumps or similar devices without the need of reducing gears, that is to say, coupled directly to such devices.

Due to the general construction of the rotor unit, which is supported by a collar-step bearing 1 and centered on bearings 3 and 4, the mechanical movement may be considered as perfect and frictionless, and it may be assumed that in the operative sector the vanes receive the full force of the wind, since in the opposite sector where the vanes are in a horizontal position, said vanes offer insufficient surface to obstruct the positive action of the wind. As a result, the rotor starts its movement with any breeze and the rotation of shaft 2 is transmitted by means of pinion 24 to pinion 25, the eccentric 28 of which is connected through coupling rod 29 to the pump or device coupled to the mill.

The rudder or steering vane 11, responding to the directional changes of the wind, adjusts the control device c to the new direction, and thus the switches formed by the slanting paths 14 are always properly located to cause the necessary shift in the position of the vanes, said shift consisting of a fractional rotation of the respective arms 6 whereby a 90° movement is obtained, which is similar to the movement of ailerons.

When the velocity of the wind is in excess, serious damage to the apparatus can be avoided, as stated above, by bringing operating handle 23 to the dotted position, whereby spindle 22, by means of its rollers 21, displaces part 20 which, operating through members 19a, shifts switching tongues 18 to the dotted position, thus excluding upper section 12 and opening side track 17, so that rollers 15 are always guided on the same plane and maintain all vanes in their horizontal or inoperative position.

With respect to the control device the crank mechanism is shielded in a carter 30 formed by a cavity in the casing a, said carter being filled with oil or grease and closed by cap 31 which is fixed to the control device c.

On the other hand gears 24 and 25, together with bearing 4 are enclosed in a carter 32 which also may contain grease or lubricating oil.

Should the current of rivers be used as the driving force for this mill, then the apparatus should be placed in an inverted position with its rotor located near the bottom of the river, and all devices which should be driven by the mill, could be coupled to the extension of shaft 2 directed towards the upper part of the apparatus.

In short, vanes 7 when in the operative sector, are in a vertical position with respect to the direction of the wind and during the rotation of the device, the vanes which reach one by one the slanting paths 14 change their position so that, when entering into the inoperative sector they are horizontal and do not offer any resistance; when the vanes reach the opposite slanting path 14, they return again to their original vertical operative position, acting in the operative sector. This mechanical switching, which goes on continually, allows the described operation of the mill.

It is evident that several modifications in construction and detail may be made by those skilled in the art, without departing from the scope of the invention as clearly set forth in the appended claims.

What is claimed is:

1. In a fluid current motor including a plurality of vanes mounted for rotation about their long axes, a crank extending from each vane for turning the same to and from a feathered position, and a cam follower on each crank, fluid current positioned rotatable cam means for operating said cranks which comprises, means defining an annular cam surface in one horizontal plane, means defining another cam surface in a plane parallel to and above said continuous surface, said other surface extending for less than 180° in an arcuate path, tongue elements pivoted to the ends of the means defining said other cam surface for bridging the space between the cam surfaces, and means for moving said tongue elements from bridging position to a raised position, whereby the cam follower on each crank may be caused to follow said horizontal annular cam surface instead of the normal surface consisting of a part of each cam surface and said tongues so as to keep the blades in feathered position throughout their entire cycle of movement.

2. A fluid current motor as claimed in claim 1 wherein the means for moving the tongue elements comprises an element connected to said tongues and disposed within the means defining said cam surfaces, said elements presenting an annular lower working surface, rollers contacting said surface, and means for raising said rollers to raise said element to shift said tongue elements to raised position.

3. A fluid current motor as claimed in claim 1 wherein the cam means also includes means defining an upper cam surface vertically spaced from and following the contour of the cam surface defined when said tongues are in bridging position, the bottoms of said tongues and said other cam surface defining means replacing a portion of said upper cam surface when said tongues are in raised position, whereby a groove type cam surface for said followers is provided in each position of the tongues.

LEOPOLDO RAMOS GIMENEZ.